July 14, 1959 R. T. HEATH ET AL 2,894,702

GIMBALED ROLLER

Filed Aug. 13, 1956 3 Sheets-Sheet 1

INVENTORS.
ROY T. HEATH
DONALD L. BURDORF
BY
Christie, Parker & Hale
ATTORNEYS

July 14, 1959 R. T. HEATH ET AL 2,894,702

GIMBALED ROLLER

Filed Aug. 13, 1956 3 Sheets-Sheet 2

INVENTORS.
ROY T. HEATH
DONALD L. BURDORF
BY
Christie, Parker & Hale
ATTORNEYS

July 14, 1959 R. T. HEATH ET AL 2,894,702

GIMBALED ROLLER

Filed Aug. 13, 1956 3 Sheets-Sheet 3

INVENTORS.
ROY T. HEATH
DONALD L. BURDORF

BY

Christie, Parker & Hale
ATTORNEYS

United States Patent Office 2,894,702

Patented July 14, 1959

2,894,702

GIMBALED ROLLER

Roy T. Heath, Temple City, and Donald L. Burdorf, Duarte, Calif., assignors to Consolidated Electrodynamics Corporation, Pasadena, Calif., a corporation of California Application August 13, 1956, Serial No. 603,724

7 Claims. (Cl. 242—76)

This invention relates to rollers used in guiding the movement of long flat material. In one of its more particular aspects this invention relates to an improved roller used in a magnetic tape recording system.

In using precision magnetic tape recorders it is imperative that the tape lie absolutely flat across the face of the magnetic heads as it moves from a pay-out reel to a take-up reel. Directly affecting this flatness are the following features:

(1) Flexibility of the tape.

(2) Non-straightness of the tape.

(3) Varying friction as the tape passes over the heads.

(4) Mis-alignment of the capstan drive to the head face.

(5) Non-uniformity of the friction drive pressure from one side of the tape to the other, as the tape is either pushed or pulled across the magnetic heads.

(6) Mis-alignment of the pay-out reel hub to the capstan drive and the magnetic heads.

(7) Mis-alignment of the take-up reel hub to the capstan drive and magnetic heads.

(8) Wobble in either the pay-out or take-up reel.

Each of the above factors can be controlled only to the limits practical with modern manufacturing processes. Errors and variables in the system accumulate. In order to cause the tape to lie smoothly across the magnetic heads without looseness, slack, ripple or washboard effect, an automatic compensating device is highly desirable.

In our invention the necessary compensation is accomplished by passing the tape lightly tensioned over a statically and dynamically balanced gimbaled roller. As the errors and variables of the system cause the tape to assume a non-flat position across the magnetic heads, the gimbaled roller will automatically assume the position necessary to cause the tape to lie flat across the magnetic heads.

For a better understanding of the invention, reference should be had to the accompanying drawings wherein.

Figure 1:
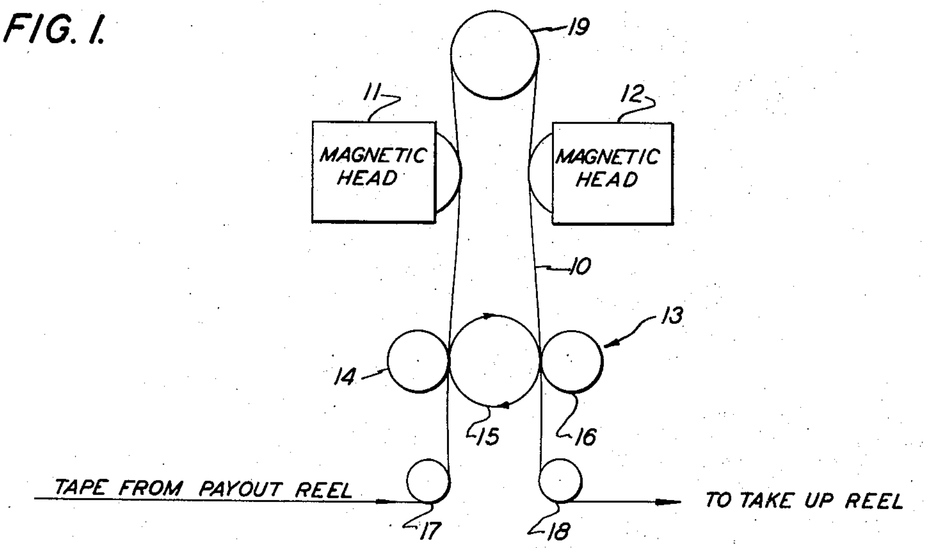
Fig. 1 is a schematic plan view showing a precision magnetic tape recorder in which our new roller has particular utility.

Referring more particularly to Fig. 1, a schematic plan view of a precision magnetic recording system is shown. Magnetic tape 10 is moved from a pay-out reel past magnetic heads 11 and 12 and then to a take-up reel. As the tape 10 proceeds past heads 11 and 12, the magnetic heads record or read signals on the tape. A separate signal track is recorded by each of the heads 11 and 12. The tape 10 is moved by a friction drive 13 including drive rollers 14, 15 and 16. Rollers 17, 18 and top roller 19 are used to guide the tape 10.

It is imperative that the tape lie flat against the heads 11 and 12. A mis-alignment of only .0001" between the heads and the tape will cause a loss of 50% of the signal. It is clear therefore that the mis-alignment tolerance is negligible. The tape 10 must lie absolutely flat against the heads 11 and 12.

Unfortunately, manufacturing processes are accurate only within limits and the elements used in a precision tape recorder introduce variables and errors which are accumulative.

Figure 2:
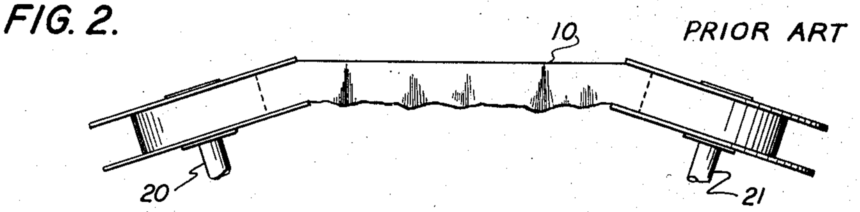
Fig. 2 illustrates one manner in which the tape may be caused to not lie flat against the magnetic heads.
Figure 3:
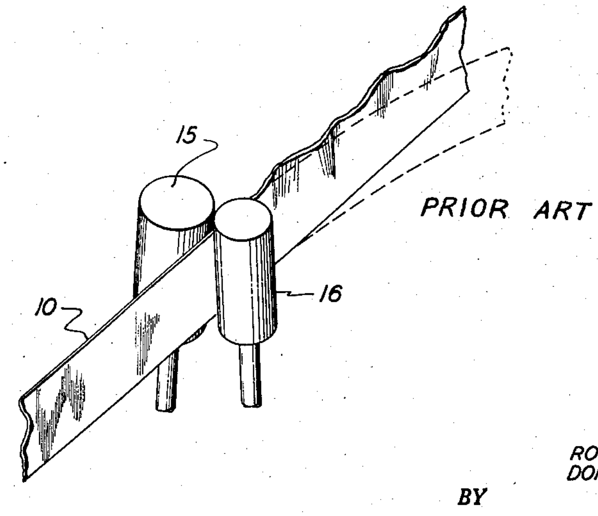
Fig. 3 illustrates another way in which slack or ripple may occur in the tape.

Figs. 2 and 3 illustrate just a few of the mis-alignments which cause the tape to develop slack, looseness and ripple, and therefore prevent the tape from lying absolutely flat against the heads.

Fig. 2 shows the pay-out reel 20 and the take-up reel 21 used in the system. In the illustration the shafts of the pay-out reel and the take-up reel are not parallel. The non-parallel position of the shafts causes less tension to be applied to the lower edge of the tape 10 than applied to the upper edge resulting in ripple and looseness in the lower edge of the tape.

A second cause of looseness, slack and ripple is illustrated in Fig. 3. The drive capstans 15 and 16 are not parallel. More pressure is developed on the upper side of the tape 10 than the lower side. Hence, the action of the capstan drives 15 and 16 causes one side of the tape to move faster than the other side. If unsupported or unguided, the tape will curl to the position shown by the dashed lines. If the tape is held straight, there will be a ripple on the side of the tape with the most friction drive pressure.

Figure 4:
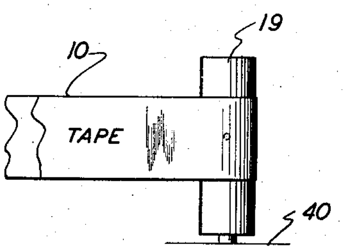
Fig. 4 is a side elevational view showing the position of our new roller when the tape has no slack, ripple or looseness.
Figure 5:
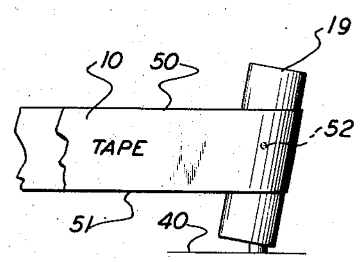
Fig. 5 shows a side elevational view of the position taken by our new roller when slack, ripple or looseness occurs in the top edge of the tape.
Figure 6:
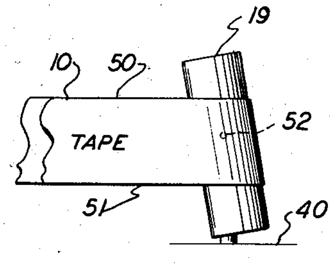
Fig. 6 is a side elevational view showing the position assumed by our new roller when slack, looseness or ripple occurs in the lower edge of the tape.

We have eliminated the problem of losing a large proportion of the signal due to slack, ripple and looseness in the tape. We do this by making the top roller 19 (see Fig. 1) pivotable in response to differences in pressure on the upper edge of the tape when compared with the pressure on the lower edge of the tape. The pivotal motion is illustrated in Figs. 4, 5 and 6. Fig 4 shows the position of the gimbaled roller 19 when there is no ripple or slack and the tape is lying flat against the magnetic heads. The roller 19 rotates about the axis perpendicular to the support 40. Support 40 (shown schematically as a horizontal line) may be the platform of the recorder upon which are also mounted capstan drives 15 and 16, and rollers 17 and 18. Fig. 5 shows the position of roller 19 when ripple or slack has occurred in the upper portion 50 of the tape 10. Since the tension in the lower portion 51 of the tape 10 is greater than the tension in the upper portion 50, the roller 19 is pivoted until the torque on both sides of the pivot point 52 is equalized. Fig. 6 shows the position assumed by the gimbaled roller 19 when the lower portion 51 of the tape 10 has developed slack, looseness or ripple.

By providing a gimbaled roller member 19, the errors and variables introduced into the system are automatically compensated for.

Figure 7:
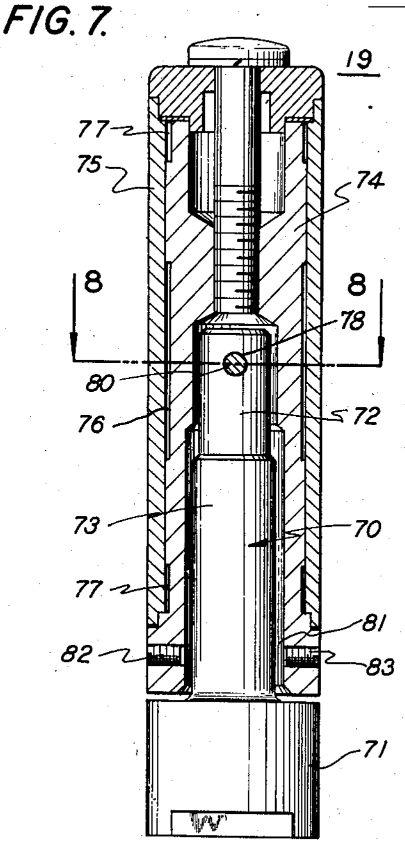
Fig. 7 is a side elevational view, partly in section, showing a preferred embodiment of our new roller.
Figure 8:
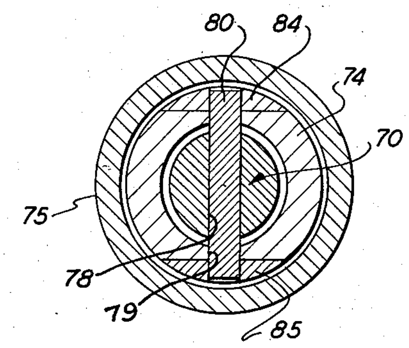
Fig. 8 is a view taken along lines 8—8 of Fig. 7.

Figs. 7 and 8 show a preferred embodiment of our new invention. A shaft or mounting mechanism includes a post 70 which is adapted to be rigidly attached to the support. The post 70 has a lower base section 71 which is directly connected to the support and an upper section 72 of reduced diameter when compared with the middle section 73. Each of the sections of the post 70 are cylindrical.

The post 70 extends into a bore provided in a rocker member 74. Mounted about the rocker member 74 is a rotatable sleeve member 75. The rotatable sleeve 75 rotates on the rocker member 74 in response to the movement of the tape which moves over the rotatable sleeve 75.

The rocker member 74 and the roller 75 have spaces 76 and 77 provided between them. These spaces contain oil for lubricating the roller 75.

Pivotal movement of the rocker member 74 is provided by means of a pivot pin 80. The pivot pin 80 is mounted in a bore 78 extending through the top portion 72 of the post 70. The bore 78 is positioned adjacent to the upper extremity of the portion 72 of the post. The pivot pin 80 may also extend into the rocker member 74, bores 79 being provided in the member 74 to receive it.

The amount of pivotal movement required to cause the tape to lie flat against the magnetic heads is generally small. Also, excessive tilt of the roller 19 will cause the tape to follow the direction of the tilt which, of course, is undesirable. To provide for a limit to the pivotal movement of the rocker member 74 a small clearance 81 is provided between the rocker 74 and the post 70. The clearance should be small enough to limit the angular movement of the rocker 74 to a maximum of about three angular degrees. For example, for a rocker having a length of 1.5 inches, this clearance is in the order of .001″ and should not be greater than about .01″.

The rocker 74 pivots about the long axis of the pivot pin 80 in response to an unbalance of the torque on either side of the pin 80 occasioned by looseness, slack or ripple in the tape which is moved over the rotatable sleeve 75. The length of sleeve 75 is about the same as the width of the tape so that the central part of the tape lies over the pivot pin 80. If an unbalancing torque occurs, the rocker member 74 and the sleeve 75 tilt until the torque forces are balanced. The tape will then lie flat against the magnetic heads. The amount of tilt is limited by the clearance 81 between the post 70 and the rocker member 74. The amount of clearance can be adjusted, if desired, by set screws 82 and 83 located on each side of the post 70. Lateral movement of the rocker member 74 is limited by the provision of a pair of washers 84 and 85 (see Fig. 8).

Figure 9:
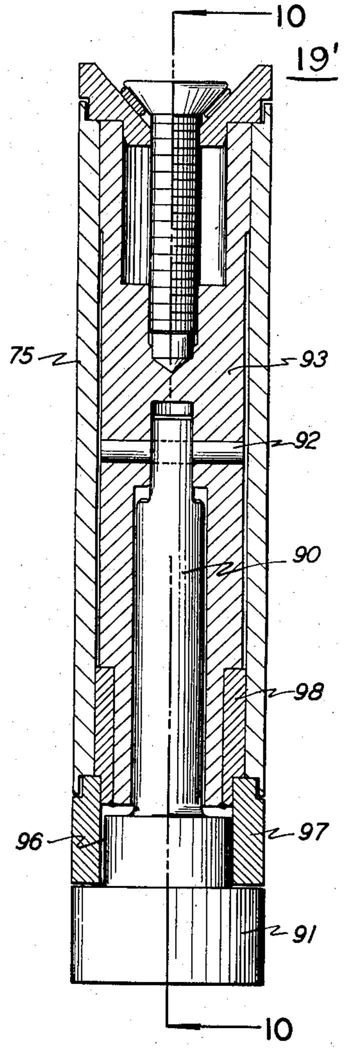
Fig. 9 is a side elevational view, partly in section, showing a second embodiment of our new roller.
Figure 10:
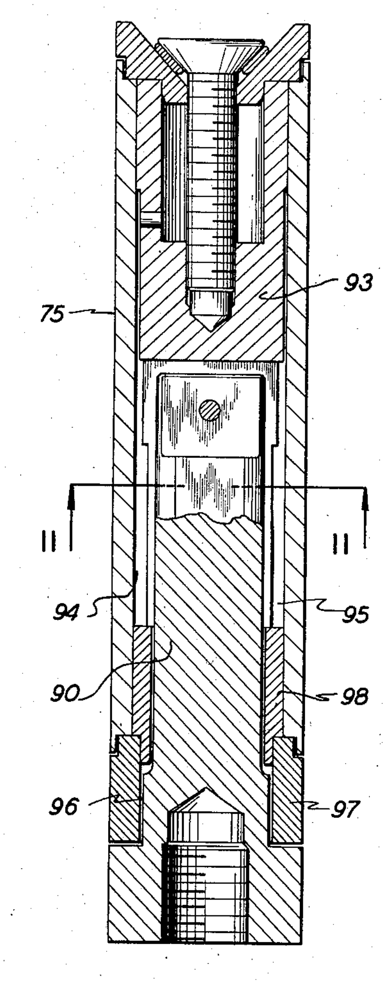
Fig. 10 is a view taken along lines 10—10 of Fig. 9.
Figure 11:
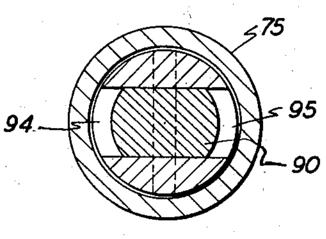
Fig. 11 is a view taken along lines 11—11 of Fig. 10.

A second embodiment of our new invention is illustrated in Figs. 9, 10 and 11. The elements of the second embodiment are essentially the same as those shown in the preferred embodiment of Figs. 7 and 8. However, the shape of the post, and the rocker member are slightly different. As shown in the figures, the post 90 includes a base 91 which is adapted to be fixedly attached to a support. The post has a pivot pin 92 positioned in a bore formed adjacent the upper extremity of the post 90. Bores are also provided in the rocker member 93 to receive the pivot pin 92. In this embodiment one cross-sectional axis of the post is longer than the other axis with the axis coincident with the axis of the pivot pin 92 being the shorter. To provide for the difference in lengths of the axis, the rocker member 93 is slotted at 94 and 95. The slots 94 and 95 extend from a point just above the upper extremity of the post 90 to the lower extremity of the rocker member 93.

A clearance 96 is provided between the post 90 and bearing rings 97 and 98. This clearance is about .001″ and should not be more than .01″ for a 1.5 inch rocker member.

The bearing ring 97 is press fitted against bearing ring 98. The function of the press fitted bearing rings 97 and 98 is to prevent mechanical deformation of the portion of the device located adjacent the base 91 of the post 90. Bearing rings 97 and 98 provide rigidity. If a single bearing ring having a small difference between the inside diameter and the outside diameter were substituted for bearing rings 97 and 98, mechanical deformation would occur.

We have provided the art with an improved roller which automatically compensates for slack, looseness and ripple which might occur in the material being transported through the roller system. Although the description has placed particular emphasis upon the use of this roller as part of a magnetic tape recording system, it is to be understood that our new device can be used for maintaining an equal tension on any type of long flat material being moved through a system including rollers.

We claim:

1. A device for guiding the movement of long flat material comprising a stationary member adapted to be attached to a fixed support, a cylindrical member pivotally mounted upon the stationary member inwardly of the free end of said stationary member, and a rotatable member supported by and disposed around the pivoted member.

2. A device for guiding the movement of long flat material comprising a stationary elongated member, a shaft for said member, and a sleeve having the same axis as the shaft rotatably mounted thereon, and means pivotally mounting the shaft and sleeve on said stationary member substantially centrally of said sleeve.

3. A device for guiding the movement of long flat material comprising a post having a base, and a bore adjacent one end thereof and extending perpendicular with respect to its axis, a rocker member having the same axis as the post and an inside diameter larger than the diameter of the post so as to provide clearance between the post and the rocker, a sleeve having the same axis as the post and the rocker loosely mounted on the rocker to permit its rotation about the rocker, and a pivot pin extending through the bore in the post and affixed to the rocker, the clearance between the rocker and the post permitting the rocker to pivot about the pivot pin.

4. A device in accordance with claim 3 wherein the clearance is such that the maximum pivotal movement of the rocker is about three angular degrees.

5. A device for guiding tape in a tape transport system comprising a rigid elongated member, a rocker member disposed coaxially with respect to the elongated member, means for providing a pivot connection of the rocker to the elongated member, a coaxial sleeve loosely mounted for rotation about the rocker for supporting and guiding the tape which is to be transported, the pivot connection lying in a line bisecting the length of the sleeve so that any change in torque on one side of the pivot connection in response to changes in tension along portions of the tape causes the rocker to pivot in a direction to correct for the changes in tension.

6. A roller for guiding material comprising a post having a base, and a bore adjacent one end thereof and extending perpendicular with respect to its axis, a rocker member having the same axis as the post and an inside diameter larger than the diameter of the post so as to provide clearance between the post and the rocker, the rocker having bores aligned with the bore in the post, a pivot pin disposed in the bores, a sleeve having the same axis as the post and the rocker loosely mounted on the rocker to permit its rotation about the rocker, the length of the sleeve being bisected by a plane through the long axis of the pivot pin and perpendicular to the common axis so that an unbalance in the torques about the pivot pin caused by an unbalance in tension in the material around the roller will effect a pivotal movement of the rocker and the sleeve about the long axis of the pivot pin to equalize the torques.

7. A roller in accordance with claim 6 wherein the clearance between the post and the rocker is such that the maximum pivotal movement of the rocker and the sleeve is about three angular degrees.

References Cited in the file of this patent

UNITED STATES PATENTS 2,684,211 Roepke ---------------- July 20, 1954

FOREIGN PATENTS 81,618 Sweden ------------------ Oct. 2, 1934